(No Model.)
G. W. SCRIBNER.
COMPENSATING ORGAN PIPE.
No. 552,148.   Patented Dec. 31, 1895.
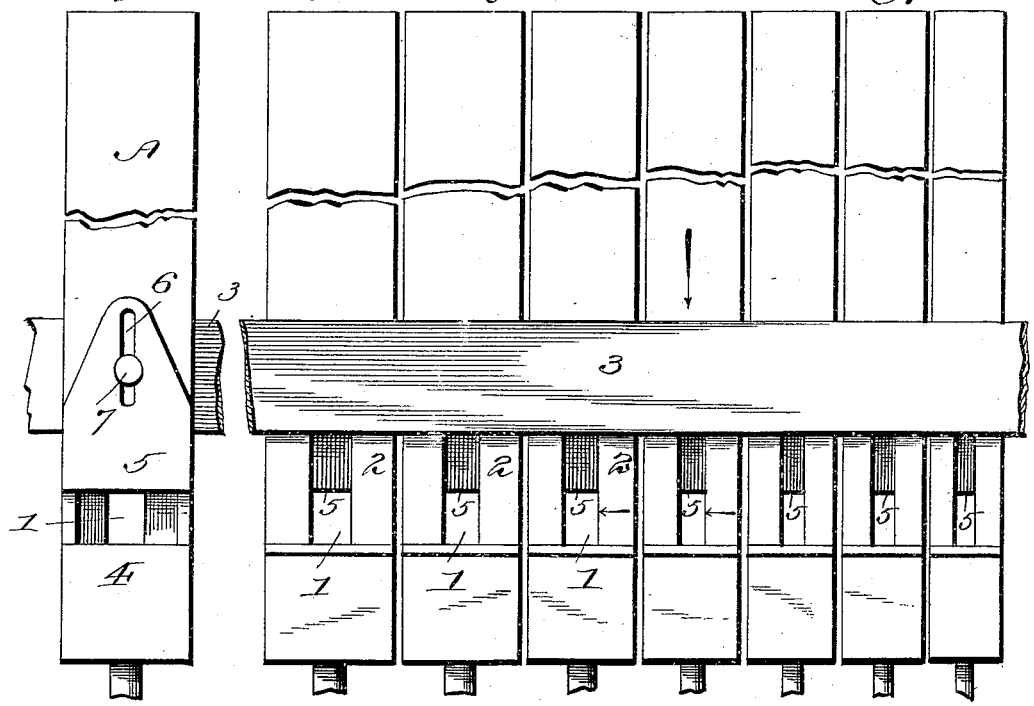
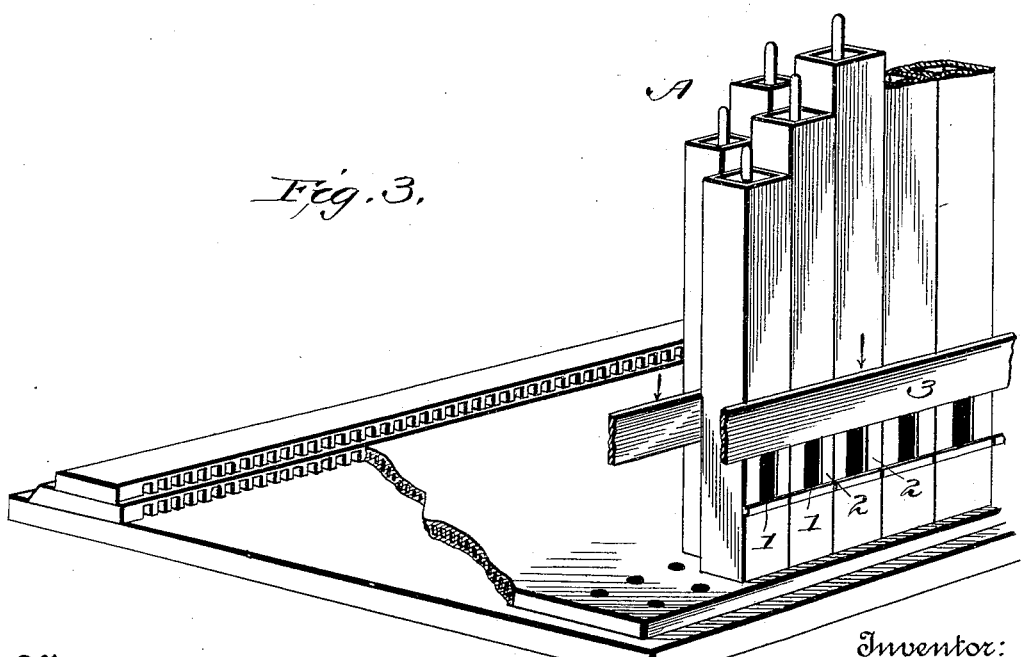

UNITED STATES PATENT OFFICE.

GEORGE W. SCRIBNER, OF LONDON, CANADA, ASSIGNOR OF THREE-FOURTHS TO JOHN ALEXANDER McINTOSH AND WILLIAM McINTOSH, OF SAME PLACE.

COMPENSATING ORGAN-PIPE.

SPECIFICATION forming part of Letters Patent No. 552,148, dated December 31, 1895.

Application filed March 28, 1895. Serial No. 543,537. (No model.)

*To all whom it may concern:*

Be it known that I, GEORGE W. SCRIBNER, a subject of the Queen of England, and a resident of London, in the county of Middlesex, in the Dominion of Canada, have invented certain new and useful Improvements in a Combined Pipe and Reed Organ; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to combined pipe and reed organs, and aims to provide improvements on my United States Letters Patent Nos. 441,589 and 467,337. Great difficulty has heretofore been experienced in organs of this class in maintaining at all times each pipe and its respective reed at the same given pitch. This was due to the fact that the reeds were not affected to change pitch in the same degree as the pipes during atmospheric changes.

It is the object of my present invention to completely overcome the difficulty mentioned and provide mechanism to compensate for differences in pitch between the reeds and pipes, which are caused by atmospheric changes.

With this object in view my invention consists of improved devices whereby the pitch of the respective tones of a series of organ flue-pipes may be simultaneously altered in connection with individual pipe-regulators.

It further consists of an adjustable lip adapted to operate to regulate the mouth-opening of an organ-pipe for the purpose of voicing.

In the accompanying drawings, Figure 1 represents a front view of an organ flue-pipe, showing the adjustable lip I employ to change the mouth-opening; Fig. 2, a rear view of a series of organ flue-pipes provided with adjustable openings and showing the application of my improved adjustable cover or slide; and Fig. 3 a perspective view of part of an organ-action containing reeds as disclosed in my Patent No. 441,589, showing my improvements applied.

A represents a series of organ-pipes. Openings are made at convenient points in the pipes of a given series, as shown at 1. I prefer to make these openings in the rear faces of the pipes of equal length and in alignment one with the other. The width of the openings in the respective pipes may be varied as found necessary by means of regulators 2, which may be operated to close or partially close the said openings and to keep them of certain fixed widths. It is obvious that these auxiliary openings 1 would give differences in the pitch of the tones of their respective pipes should the amount of the opening be varied. Each of these openings having been given its fixed width, the pitch of the tones of the respective pipes may be varied through the agency of devices which will now be described.

3 represents covers or slides, each of which is of sufficient length to extend entirely across its respective row or series of pipes. These covers are adapted to operate to simultaneously close or partially close the openings 1, and thus the pitch of the tones of the pipes may be regulated. Owing to the perfect alignment of the openings 1, the covers 3 act to alter the size of each opening in such manner that the fixed ratio between them will always remain unchanged. The slides or covers 3 may be operated through suitable lever mechanism and a stop of the stop-board, or in any other desired manner.

The usual pipe-mouths are represented at 4.

I find that when the pipes A are provided with the openings 1 the character of the tone becomes altered. I therefore find it desirable to employ an adjustable lip 5 on each pipe, by means of which the character of the tones of the respective pipes may be regulated. Each lip 5 is slotted at 6, and a set-screw 7 passed therethrough and into the pipe A, to afford means whereby the necessary adjustment of the mouth-opening may be made.

The functions and operation of my invention will now be explained. To obtain a like pitch between each pipe and its respective reed the following operations must be undergone: The regulators 2 on each pipe are adjusted until there is a given difference between the pitch of the tone of the pipe when the opening 1 is closed and when it is open. This having been accomplished, the openings 1 are partially closed by the covers 3, and the pipes may be brought to the same pitch as the reeds by the usual method of tuning. As before stated, the lips 5 are employed to regulate the tones of the respective pipes. It is obvious that should the pipes or reeds be affected by a change in atmospheric conditions, the covers 3 may be operated to alter the pitch of the tones of the pipes and to bring them to the same pitch as the respective reeds. As the atmospheric changes will affect the pipes in a manner to cause their respective pitches to maintain the same ratio one to the other as previously, it will be seen that the covers 3 will not disturb that ratio.

I do not limit myself to the details of construction herein shown and described, but consider myself entitled to all such variations as come within the spirit and scope of my invention. Furthermore, I do not limit myself to the use of my improved devices in connection with flue-pipes only, but consider myself entitled to employ them in connection with pipes of any character whatsoever. Neither do I limit myself to the use of my devices in connection with all of the series of pipes in an organ, as my improvements might be applied only to one or more given series of pipes.

Having thus described my invention, what I claim as new, and desire to secure by Letters Patent, is—

1. A series of organ pipes having openings provided with individual regulators, in combination with an additional regulator arranged to simultaneously adjust the size of all the adjusted openings, substantially as described.

2. The combination with a series of organ pipes constructed with the usual mouths and having openings provided with individual regulators, of an additional regulator arranged to simultaneously adjust the size of all the adjusted openings, and lips whereby the pipe mouths may be adjusted, substantially as described.

In witness whereof I affix my signature in presence of two witnesses.

G. W. SCRIBNER.

Witnesses:
CHARLES J. WALLACE,
JOHN M. WEEKS.